United States Patent
Ohtake et al.

(10) Patent No.: US 9,641,088 B2
(45) Date of Patent: May 2, 2017

(54) CURRENT RESONANT POWER SOURCE APPARATUS

(71) Applicant: Sanken Electric Co., Ltd., Niiza-shi, Saitama (JP)

(72) Inventors: Osamu Ohtake, Niiza (JP); Ryuichi Furukoshi, Asaka (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 120 days.

(21) Appl. No.: 14/637,506

(22) Filed: Mar. 4, 2015

(65) Prior Publication Data
US 2015/0256088 A1    Sep. 10, 2015

(30) Foreign Application Priority Data
Mar. 6, 2014 (JP) .................. 2014-043815

(51) Int. Cl.
| H02M 1/36 | (2007.01) |
| H02M 3/335 | (2006.01) |
| H02M 3/337 | (2006.01) |
| H02M 1/00 | (2006.01) |

(52) U.S. Cl.
CPC ......... H02M 3/33546 (2013.01); H02M 1/36 (2013.01); H02M 3/3376 (2013.01); H02M 2001/0032 (2013.01); H02M 2001/0058 (2013.01); Y02B 70/1433 (2013.01); Y02B 70/1491 (2013.01); Y02B 70/16 (2013.01)

(58) Field of Classification Search
CPC .......... H02M 1/36; H02M 2001/0058; H02M 3/335; H02M 3/33553
See application file for complete search history.

(56) References Cited

U.S. PATENT DOCUMENTS

| 2007/0165426 A1* | 7/2007 | Kyono .................. H02M 3/337 363/21.02 |
| 2013/0121036 A1 | 5/2013 | Peng et al. |

FOREIGN PATENT DOCUMENTS

| JP | 07-135769 A | 5/1995 |
| JP | H08-111977 A | 4/1996 |
| JP | 2001-103734 A | 4/2001 |
| JP | 2001-119941 A | 4/2001 |
| JP | 2001-157446 A | 6/2001 |
| JP | 2002-354801 A | 12/2002 |

(Continued)

OTHER PUBLICATIONS

The Japanese OA issued on Jul. 12, 2016 in the counterpart Japanese patent application. Application 2014-043815. 4 pages.

*Primary Examiner* — Harry Behm
(74) *Attorney, Agent, or Firm* — Mots Law, PLLC

(57) ABSTRACT

A current resonant power source apparatus includes a series circuit (Lr, P, C2) connected between switch elements Q1 and Q2 and a capacitor C1, a full-wave rectifying and smoothing circuit (D1, D2, C3) for providing a DC voltage, a control circuit of Q1 and Q2, a voltage detector 11 of the DC voltage, a current detector of the primary winding P, a soft-start time constant setting unit, and an ON time controller. If a voltage generated to a time constant is smaller than a set voltage, the ON time controller sets an ON time for Q1 and Q2 according to the DC voltage and soft-start signal, and if it is equal to or greater than the set voltage, sets one of the first and second ON times according to the current from the current detector.

12 Claims, 14 Drawing Sheets

(56) References Cited

FOREIGN PATENT DOCUMENTS

| JP | 2005-051918 A | 2/2005 |
| JP | 2006-204044 A | 8/2006 |
| JP | 2009-189107 A | 8/2009 |
| JP | 2011-083130 A | 4/2011 |
| JP | 2012-029436 A | 2/2012 |
| JP | 2013-078228 A | 4/2013 |

* cited by examiner

CONTROL AT ON DUTY OF 50%

CONTROL ACCORDING TO EMBODIMENT 5

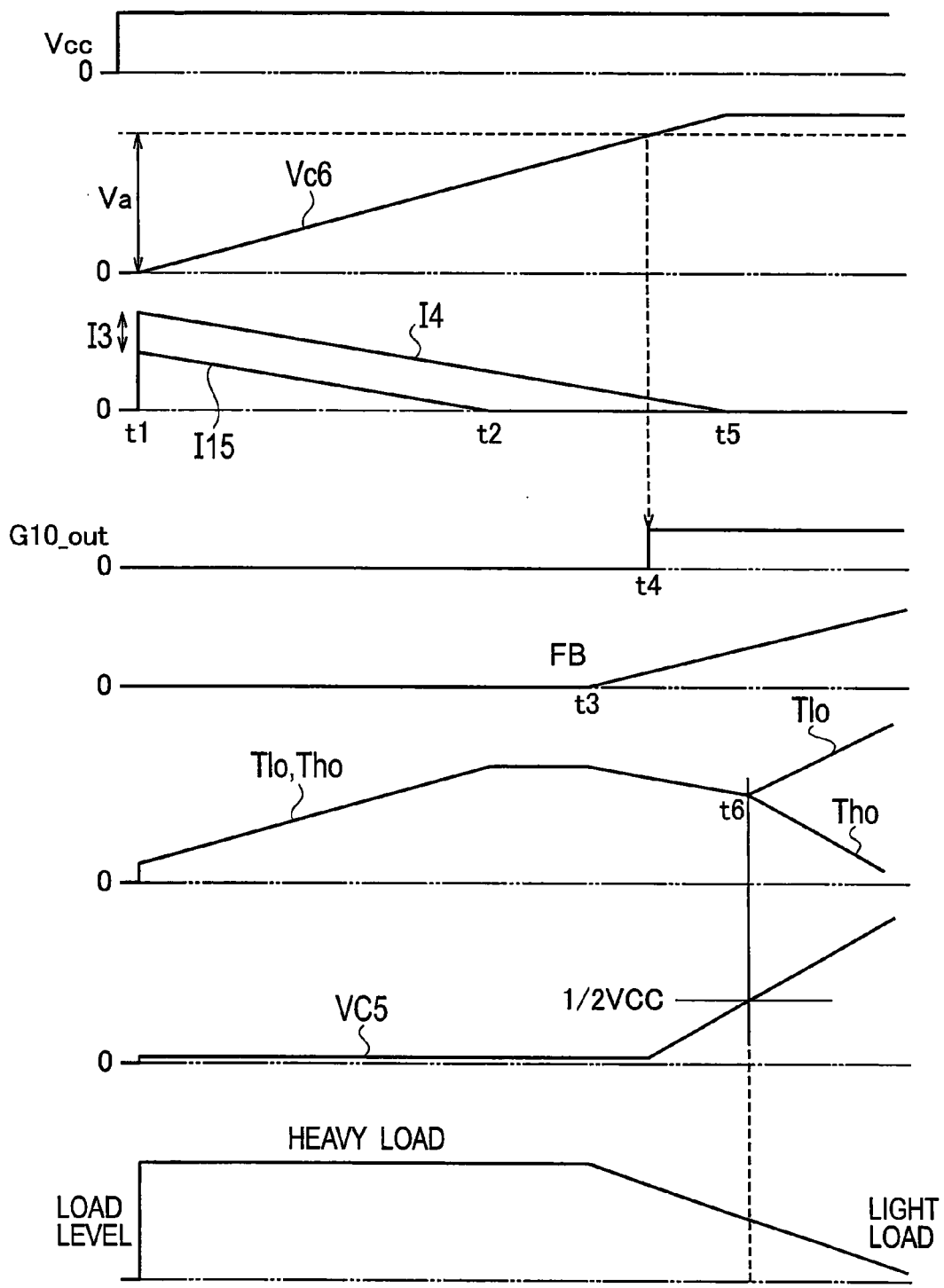

CURRENT RESONANT POWER SOURCE APPARATUS

BACKGROUND OF THE INVENTION

1. Field of the Invention

The present invention relates to a current resonant power source apparatus, and particularly, to controlling an output voltage of the current resonant power source apparatus under light load.

2. Description of Related Art

FIG. 2 is a circuit diagram illustrating a current resonant power source apparatus according to a related art. In FIG. 2, a full-wave rectifying circuit RC1 rectifies AC voltage. Both ends of the full-wave rectifying circuit RC1 are connected to a smoothing capacitor C1 and a series circuit of MOSFET switch elements Q1 and Q2. The switch elements Q1 and Q2 are alternately turned on and off. Both ends of the switch element Q2 are connected to a series circuit including a resonant reactor Lr, a primary winding P of a transformer T, and a current resonant capacitor C2.

The transformer T has secondary windings S1 and S2 that are connected in series. A second end of the secondary winding S1 is connected to an anode of a diode D1. A first end of the secondary winding S2 is connected to an anode of a diode D2. Cathodes of the diodes D1 and D2 are connected to a first end of a smoothing capacitor C3. A second end of the smoothing capacitor C3 is connected to a node between a first end of the secondary winding S1 and a second end of the secondary winding S2. The first and second ends of the smoothing capacitor C3 are connected to a detector 11. The resonant reactor Lr may be a leakage inductance of the transformer T.

The detector 11 detects an output voltage of the smoothing capacitor C3 and outputs the detected voltage to an oscillator 13. According to the output voltage of the smoothing capacitor C3, the oscillator 13 changes the oscillation frequency of a frequency signal to output. A comparator CM1 compares the frequency signal from the oscillator 13 with a divided voltage obtained by dividing a voltage of a power source Vcc by resistors R1 and R2, and if the frequency signal is equal to or greater than the divided voltage, outputs a high-level signal. If the frequency signal is smaller than the divided voltage, the comparator CM1 outputs a low-level signal.

An inverter IN1 inverts the output of the comparator CM1, to turn on/off the switch element Q2. A high-side driver 12 turns on/off the switch element Q1 according to the output of the comparator CM1.

Operation of the current resonant power source apparatus according to the related art having the above-mentioned configuration will be explained. When the switch element Q1 is turned on, a current passes clockwise through a path extending along RC1, Q1, Lr, P, C2, and RC1. This current is a resultant current of an exciting current passing through an exciting inductance Lp on the primary side of the transformer T and a load current supplied through the primary winding P, secondary winding S2, diode D2, and capacitor C3 to an output terminal OUT and a load. The exciting current mentioned above is a sinusoidal resonance current of the "reactor Lr+exciting inductance Lp" and current resonant capacitor C2. Part of the sinusoidal resonance current is observed as a triangular current because a resonance frequency is lower than an ON period of the switch element Q1. The load current mentioned above is a sinusoidal resonance current involving a resonance element of the reactor Lr and current resonant capacitor C2.

When the switch element Q1 is turned off, energy accumulated in the transformer T by the exciting current causes the "reactor Lr+exciting inductance Lp", the current resonant capacitor C2, and a voltage resonant capacitor Crv (not illustrated) appearing between each end of the switch element Q2 to demonstrate a quasi-voltage-resonance. At this time, a resonance frequency of the voltage resonant capacitor Crv whose capacitance is small is observed as a voltage across the switch elements Q1 and Q2. Namely, when the switch element Q1 is turned off, the current of the switch element Q1 shifts to the voltage resonant capacitor Crv. When the voltage resonant capacitor Crv is discharged to zero volts, the current shifts to an internal diode of the switch element Q2. This causes the energy accumulated in the transformer T by the exciting current to charge the current resonant capacitor C2 through the internal diode of the switch element Q2. During this period, the switch element Q2 is turned on to realize the zero-volt switching of the switch element Q2.

When the switch element Q2 is turned on, the current resonant capacitor C2 serves as a power source to pass a current counterclockwise through a route extending along C2, P, Lr, Q2, and C2. This current is a resultant current of an exciting current passing through the exciting inductance Lp of the transformer T and a load current supplied through the primary winding P, secondary winding S1, diode D1, and smoothing capacitor C3 to the output terminal OUT and load. The exciting current mentioned above is a sinusoidal resonance current of the "reactor Lr+exciting inductance Lp" and current resonant capacitor C2. Part of the sinusoidal resonance current is observed as a triangular current because a resonance frequency is lower than an ON period of the switch element Q2. The load current mentioned above is a sinusoidal resonance current involving a resonance element of the reactor Lr and current resonant capacitor C2.

When the switch element Q2 is turned off, energy accumulated in the transformer T by the exciting current causes the "reactor Lr+exciting inductance Lp", the current resonant capacitor C2, and the voltage resonant capacitor Crv to demonstrate a quasi-voltage-resonance. At this time, a resonance frequency of the voltage resonant capacitor Crv whose capacitance is small is observed as a voltage across the switch elements Q1 and Q2. Namely, when the switch element Q2 is turned off, the current of the switch element Q2 shifts to the voltage resonant capacitor Crv. When the voltage resonant capacitor Crv is charged to the output voltage of the smoothing capacitor C1, the current shifts to an internal diode of the switch element Q1. This causes the energy accumulated in the transformer T by the exciting current to be regenerated to the smoothing capacitor C1 through the internal diode of the switch element Q1. During this period, the switch element Q1 is turned on to realize the zero-volt switching of the switch element Q1.

FIG. 3 illustrates waveforms at different parts of the current resonant power source apparatus of the related art under light load. In FIG. 3, Id (Q1) is a drain current of the switch element Q1, I(P) is a current passing through the primary winding P, V(C2) is a voltage across the current resonant capacitor C2, Vds(Q2) is a drain-source voltage of the switch element Q2, V(P) is a voltage across the primary winding P, V(D1) is a voltage across the diode D1, and V(D2) is a voltage across the diode D2.

The current resonant power source apparatus of the related art alternately turns on/off the switch elements Q1 and Q2 at a duty of 50% and controls a switching frequency, thereby controlling an output voltage. As illustrated in FIG. 3, the voltage V(C2) of the current resonant capacitor C2 repeats an up-down symmetrical charging and discharging actions around a half of a voltage V (C1) of the smoothing capacitor C1. As a result, the primary winding P of the transformer T generates the voltage V(P) to generate voltages on the secondary windings S1 and S2. These voltages are rectified through the diodes D1 and D2, to provide an output voltage.

Related arts concerning the current resonant power source apparatus include Japanese Unexamined Patent Application Publications No. 2013-78228 (Patent Literature 1) and No. H07-135769 (Patent Literature 2).

SUMMARY OF THE INVENTION

The current resonant power source apparatus according to the related art is unable to output a sufficient voltage if started under heavy load. Namely, the related art is insufficient in startup performance under heavy load.

The present invention provides a current resonant power source apparatus capable of improving startup performance.

According to an aspect of the present invention, the current resonant power source apparatus includes first and second switch elements connected in series with both ends of a DC power source, a series circuit connected between a node of the first and second switch elements and a first end of the DC power source and including a reactor, a primary winding of a transformer, and a capacitor, a full-wave rectifying and smoothing circuit that full-wave-rectifies and smoothes a voltage generated by a secondary winding of the transformer and provides a DC voltage, a control circuit that alternately turns on/off the first and second switch elements according to a first ON time for the first switch element and a second ON time for the second switch element, a voltage detector that detects the DC voltage provided by the full-wave rectifying and smoothing circuit, a current detector that detects a current passing through the primary winding of the transformer, a soft-start time constant setting unit that generates a soft-start signal at startup and sets a soft-start time constant, and an ON time controller. If a voltage generated according to the time constant set by the soft-start time constant setting unit is smaller than a set voltage, the ON time controller sets an ON time for the first and second switch elements according to the DC voltage from the voltage detector and the soft-start signal. If the voltage generated according to the time constant is equal to or greater than the set voltage, the ON time controller sets one of the first and second ON times according to the current detected by the current detector.

According to another aspect of the present invention, the current resonant power source apparatus includes first and second switch elements connected in series with both ends of a DC power source, a series circuit connected between a node of the first and second switch elements and a first end of the DC power source and including a reactor, a primary winding of a transformer, and a capacitor, a full-wave rectifying and smoothing circuit that full-wave-rectifies and smoothes a voltage generated by a secondary winding of the transformer and provides a DC voltage, a control circuit that alternately turns on/off the first and second switch elements according to a first ON time for the first switch element and a second ON time for the second switch element and controls a switching frequency of the first and second switch elements according to the DC voltage, a current detecting unit that detects a current of the capacitor, a soft-start time constant setting unit that generates a soft-start signal at startup and sets a soft-start time constant, and an ON time controller. If a voltage generated according to the time constant set by the soft-start time constant setting unit is smaller than a set voltage, the ON time controller sets an ON time for the first and second switch elements according to the DC voltage and the soft-start signal. If the voltage generated according to the time constant is equal to or greater than the set voltage, the ON time controller sets an ON time for the first and second switch elements according to the current of the capacitor detected by the current detecting unit.

BRIEF DESCRIPTION OF THE DRAWINGS

FIG. 14 is a timing chart illustrating a soft-start operation of the current resonant power source apparatus of Embodiment 5 to increase an output voltage at startup.

DESCRIPTION OF PREFERRED EMBODIMENTS

Current resonant power source apparatuses according to embodiments of the present invention will be explained in detail with reference to the drawings.

Embodiment 1

Figure 4:
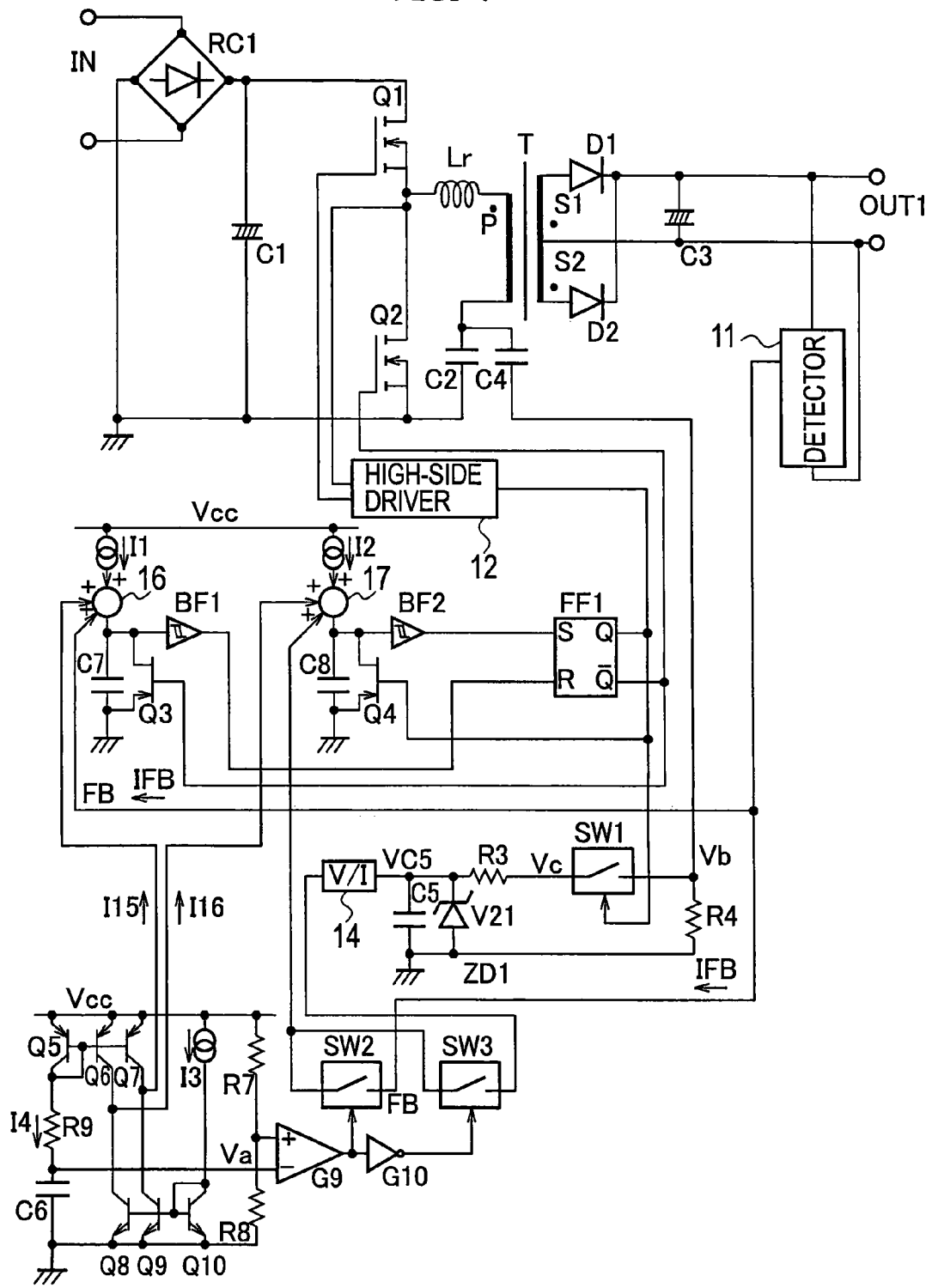
FIG. 4 is a circuit diagram illustrating a current resonant power source apparatus according to Embodiment 1 of the present invention.

FIG. 4 is a circuit diagram illustrating a current resonant power source apparatus according to Embodiment 1 of the present invention. In FIG. 4, a voltage VC5 of a capacitor C5 is not sufficiently large at startup of the apparatus. If load on the apparatus is heavy at startup, an output voltage of the apparatus will be insufficient and this insufficient output voltage will continue even when the load changes from heavy to medium to light. Namely, the startup performance of the apparatus deteriorates if the apparatus is started under heavy load. To solve this problem, the current resonant power source apparatus according to Embodiment 1 operates at a duty of 50% for a predetermined period at startup.

More precisely, the apparatus according to the present embodiment blocks an output of a voltage/current (V/I) converter 14 and passes part of a charge current of a capacitor C6 as soft-start signals I15 and I16 to capacitors C7 and C8, thereby operating the apparatus at a duty of 50% for the predetermined period at startup. This operation increases the voltage VC5 of the capacitor C5, thereby improving the startup performance of the apparatus.

The current resonant power source apparatus according to the present embodiment illustrated in FIG. 4 has a soft-start circuit for soft-starting the apparatus at startup. The soft-start circuit will be explained in detail.

A power source Vcc is connected to emitters of pnp transistors Q5, Q6, and Q7, a first end of a current source I3, and a first end of a resistor R7. Bases of the transistors Q5, Q6, and Q7 are commonly connected. The base and collector of the transistor Q5 is connected to a first end of a resistor R9.

A collector of the transistor Q6 is connected to a collector of an npn transistor Q8 and an adder 17. A collector of the transistor Q7 is connected to a collector of an npn transistor Q9 and an adder 16.

At startup, the transistor Q6 transmits a soft-start signal I16 to the adder 17. At this time, the transistor Q7 transmits a soft-start signal I15 to the adder 16. The transistors Q5, Q6, and Q7 form a soft-start signal transmission circuit and a current mirror circuit.

A second end of the resistor R9 is connected to a first end of the capacitor C6. A second end of the capacitor C6 is grounded. The transistor Q5 passes a current I4 through the resistor R9, to charge the capacitor C6. The resistor R9 and capacitor C6 form a soft-start time constant setting circuit that generates the soft-start signal at startup and sets a soft-start time constant.

The collector of the transistor Q6 is connected to the collector of the npn transistor Q8. An emitter of the transistor Q8 is grounded. The collector of the transistor Q7 is connected to the collector of the npn transistor Q9. An emitter of the transistor Q9 is grounded. A second end of the current source I3 is connected to a collector and base of an npn transistor Q10. An emitter of the transistor Q10 is grounded. Bases of the transistors Q8, Q9, and Q10 are commonly connected. The transistors Q8, Q9, and Q10 and the current source I3 form a soft-start end setting circuit.

A second end of the resistor R7 is connected to a non-inverting input terminal of a comparator G9 and a first end of a resistor R8. A second end of the resistor R8 is grounded. The resistors R7 and R8 form a detection current setting circuit that divides a voltage of the power source Vcc by the resistors R7 and R8, to set a voltage Va to be compared with a voltage of the capacitor C6.

The second end of the resistor R9 and the first end of the capacitor C6 are connected to an inverting input terminal of the comparator G9. The comparator G9 compares the voltage of the capacitor C6 with the set voltage Va provided by the resistors R7 and R8. If the voltage of the capacitor C6 is smaller than the set voltage Va, the comparator G9 outputs a high-level signal to an inverter G10 and a switch SW2. This results in turning on the switch SW2 and transferring a feedback quantity FB from a detector 11 to the adder 17. Namely, if the voltage of the capacitor C6 is smaller than the set voltage Va, the feedback quantity FB from the detector 11 and the soft-start signals I15 and I16 determine an ON time Tho for a switch element Q1 and an ON time Tlo for a switch element Q2.

The comparator G9 forms a voltage detector. If the voltage of the capacitor C6 is equal to or greater than the set voltage Va, the comparator G9 outputs a low-level signal to the inverter G10 and switch SW2. This results in turning on a switch SW3 through the inverter G10 and transferring an output of the voltage/current converter 14 to the adder 17. Namely, if the voltage of the capacitor C6 is equal to or greater than the set voltage Va, the current value from the voltage/current converter 14 determines the ON time Tho for the switch element Q1.

When the comparator G9 outputs a high-level signal, the switch SW2 turns on to send the feedback signal FB from the detector 11 to the adder 17. When the comparator G9 outputs a low-level signal, the switch SW3 turns on to send the output of the voltage/current converter 14 to the adder 17. Namely, the switches SW2 and SW3 form a control switching circuit.

The current resonant power source apparatus of the present embodiment has a control circuit that, when load is heavy to make the feedback quantity FB small, sets the same predetermined time as a first ON time for the switch element Q1 and a second ON time for the switch element Q2 and alternately turns on/off the switch elements Q1 and Q2. Namely, the control circuits sets the same ON time for the switch elements Q1 and 02 to drive the switch elements Q1 and Q2 at a duty of 50% if load is heavy.

To turn on/off the switch elements Q1 and Q2, a dead time is needed in which the switch elements Q1 and Q2 are both OFF. It is supposed that the dead time is already set and the detailed explanation thereof is omitted because the dead time is not essential for the present invention.

In the control circuit, a current source I1, the adder 16, the capacitor C7, a MOSFET Q3, a buffer BF1, and a flip-flop circuit FF1 form a circuit for setting the first ON time for the switch element Q1.

Also in the control circuit, a current source I2, the adder 17, the capacitor C8, a MOSFET Q4, a buffer BF2, and the flip-flop circuit FF1 form a circuit for setting the second ON time Tlo for the switch element Q2.

When load is light, the feedback quantity FB based on a DC voltage detected by the detector 11 is large. In this case, the adder 16 adds a current of the current source I1, a larger feedback current IFB, and the soft-start signal I15, to increase a current and shorten the first ON time Tho for the switch element Q1 shorter than a predetermined time. The current source I1 and adder 16 form a first ON time controller.

The switch element Q1 corresponds to the first switch element stipulated in the claims and the switch element Q2 corresponds to the second switch element stipulated in the claims. Diodes D1 and D2 and a smoothing capacitor C3 form a full-wave rectifying and smoothing circuit that full-wave-rectifies and smoothes voltages generated by secondary windings S1 and S2 of a transformer T and provides a DC voltage.

Connections of the control circuit will be explained. The power source Vcc is connected to a first end of the current source I1. A second end of the current source I1 is connected through the adder 16 to a first end of the capacitor C7, a drain of the MOSFET Q3, and an input end of the buffer BF1. A second end of the capacitor C7 and a source of the MOSFET Q3 are grounded. A gate of the MOSFET Q3 is connected to an inverting output terminal Qb ("Q" with an overbar in FIG. 4) of the flip-flop circuit FF1 and a gate of the low-side switch element Q2. An output terminal of the buffer BF1 is connected to a reset terminal R of the flip-flop circuit FF1.

The adder 16 adds a current from the current source I1, the feedback current IFB corresponding to the feedback quantity FB detected by the detector 11, and the soft-start signal I15 and charges the capacitor C7 with the resultant current.

The power source Vcc is connected to a first end of the current source I2. A second end of the current source I2 is connected through the adder 17 to a first end of the capacitor C8, a drain of the MOSFET Q4, and an input end of the buffer BF2. A second end of the capacitor C8 and a source of the MOSFET Q4 are grounded. A gate of the MOSFET Q4 is connected to an output terminal Q of the flip-flop circuit FF1 and a high-side driver 12. An output terminal of the buffer BF2 is connected to a set terminal S of the flip-flop circuit FF1.

The current resonant power source apparatus of the present embodiment also includes a second ON time controller that includes the capacitors C4 and C5, resistors R3, and R4, a switch SW1, a zener diode ZD1, and the voltage/current converter 14.

The second ON time controller divides a current passing through the resonant capacitor C2 due to a capacitance ratio of the capacitors C2 and C4. If an average current value detected by the capacitor C4, i.e., if an average current value of the switch element Q1 is small to indicate light load, the second ON time controller elongates the second ON time Tlo for the switch element Q2 longer than the predetermined time. If the average current value of the switch element Q1 is large to indicate heavy load, the second ON time controller sets the second ON time Tlo for the switch element Q2 to a predetermined time.

A first end of the capacitor C4 is connected to a second end of the primary winding P of the transformer T and a first end of the capacitor C2, to form a current detector that detects a current passing through the primary winding P of the transformer T. A second end of the capacitor C4 is connected to a first end of the resistor R4 and a first end of the switch SW1. A second end of the resistor R4 is grounded.

A second end of the switch SW1 is connected to a first end of the resistor R3. A second end of the resistor R3 is connected to a first end of the capacitor C5 and an input terminal of the voltage/current converter 14. A second end of the capacitor C5 is grounded. Both ends of the capacitor C5 are connected to the zener diode ZD1. The zener diode ZD1 clamps a voltage and is used to set an initial duty of the switch elements Q1 and Q2 to 50%. An output terminal of the voltage/current converter 14 is connected to the switch SW3.

When the output terminal Q of the flip-flop circuit FF1 outputs a high-level signal, the switch SW1 turns on. The adder 17 adds a current from the current source I2, a current from the switch SW3, and the soft-start signal I16 and charges the capacitor C8 with the resultant current.

Figure 5:
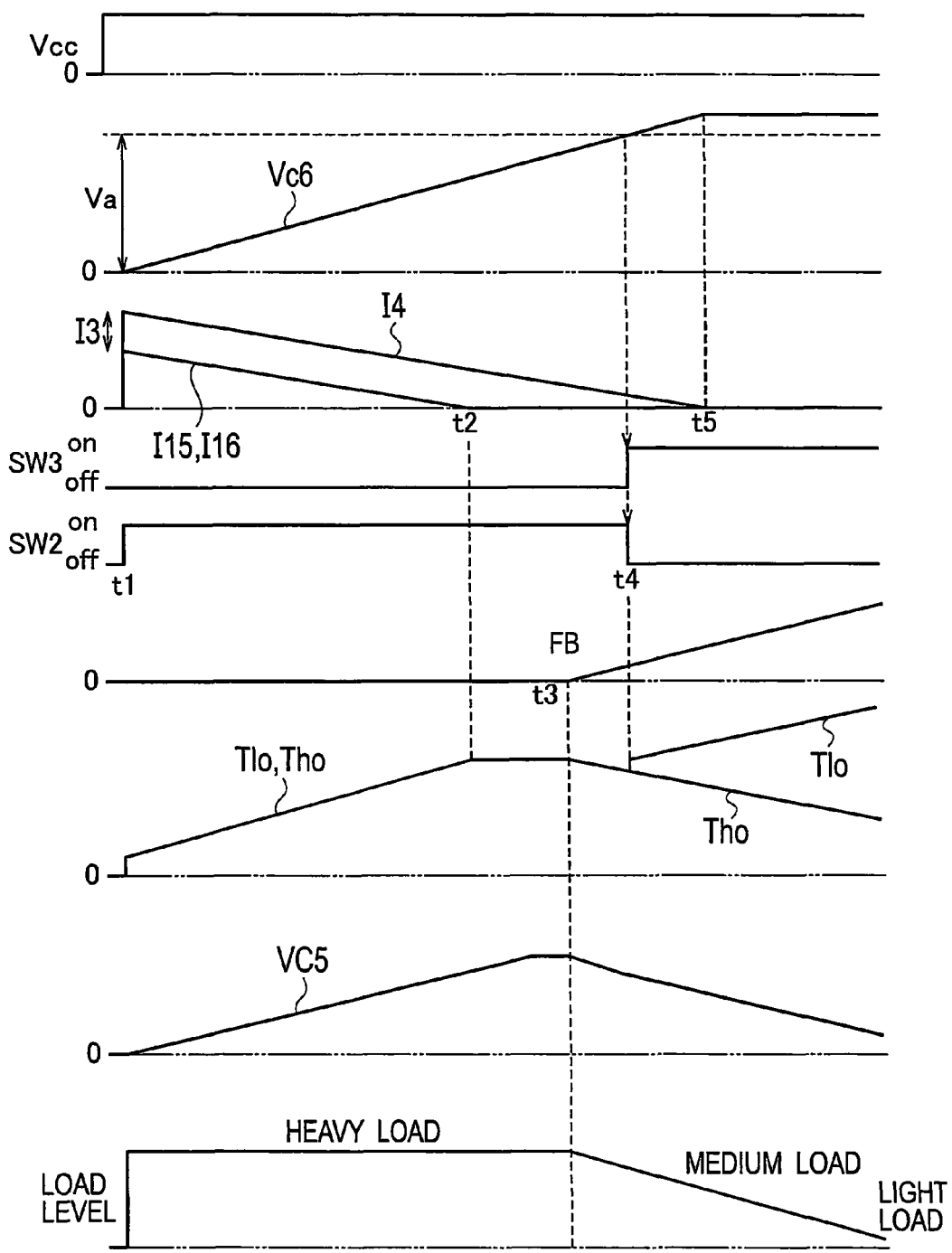
FIG. 5 is a timing chart illustrating a soft-start operation of the current resonant power source apparatus of Embodiment 1 to increase an output voltage at startup.

Operation of the current resonant power source apparatus according to the present embodiment will be explained in detail with reference to FIGS. 4 and 5. FIG. 5 is a timing chart illustrating operation at different parts of the current resonant power source apparatus of Embodiment 1 when the apparatus is soft-started at startup to increase the output voltage VC5.

At time t1, the power source Vcc is activated. The transistors Q5, Q6, and Q7 turn on to pass the current I4 through the resistor R9 to the capacitor C6. A voltage Vc6 of the capacitor C6 linearly increases up to time t5. The current I4 linearly decreases from time t1 to t5.

From time t1 to t4, the voltage Vc6 of the capacitor C6 is smaller than the set voltage Va, and therefore, the comparator G9 provides the switch SW2 with a high-level signal to turn on the switch SW2 and off the switch SW3.

From time t1 to t2, the transistor Q6 passes the soft-start signal I16 that is the current I4 drawn by the current source I3 (as a differential current) in order to transmit the current signal I16 to the adder 17. The transistor Q7 passes the soft-start signal I15 that is the current I4 drawn by the current source I3 for transmitting that to the adder 16.

The adder 16 adds the soft-start signal I15 to the current source I1 and charges the capacitor C7 with the resultant current. The adder 17 adds the soft-start signal I16 to the current source I2 and charges the capacitor C8 with the resultant current. The soft-start signals I15 and I16 decrease from time t1 to t2, and therefore, the ON time Tho for the switch element Q1 and the ON time Tlo for the switch element Q2 gradually elongate.

As the switch elements Q1 and Q2 are turned on/off, the voltage VC5 of the capacitor C5 gradually increases. At time t3, the feedback quantity FB from the detector 11 starts to linearly increase. At time t4, the voltage Vc6 of the capacitor C6 reaches the set voltage Va, and therefore, the comparator G9 provides the switch SW2 with a low-level signal. This turns off the switch SW2 and on the switch SW3, so that the output of the voltage/current converter 14 is transmitted to the adder 17.

Operation under heavy load will be explained. It is assumed that the capacitor C8 is charged. At this time, the buffer BF2 outputs a high-level signal to the set terminal S of the flip-flop circuit FF1 and the output terminal Q of the flip-flop circuit FF1 outputs a high-level signal to the high-side driver 12 to turn on the switch element Q1.

At the same time, the high-level signal from the output terminal Q of the flip-flop circuit FF1 is supplied to the gate of the MOSFET Q4 to turn on the MOSFET Q4. This results in discharging the capacitor C8. The inverting output terminal Qb of the flip-flop circuit FF1 outputs a low-level signal to the gate of the MOSFET Q3 to turn off the MOSFET Q3.

The adder 16 adds the current of the current source I1 and the feedback current IFB and charges the capacitor C7 with the resultant current. Accordingly, the voltage of the capacitor C7 increases.

When the voltage of the capacitor C7 exceeds a predetermined value, the buffer BF1 outputs a high-level signal to the reset terminal R of the flip-flop circuit FF1. Then, the inverting output terminal Qb of the flip-flop circuit FF1 outputs a high-level signal to the gate of the switch element Q2 to turn on the switch element Q2. The high-level signal from the inverting output terminal Qb of the flip-flop circuit FF1 is also supplied to the gate of the MOSFET Q3 to turn on the MOSFET Q3. This results in discharging the capacitor C7.

At this time, the output terminal Q of the flip-flop circuit FF1 outputs a low-level signal to the gate of the MOSFET Q4 to turn off the MOSFET Q4. This results in increasing the voltage of the capacitor C8. This will be explained later in detail.

The low-level signal from the output terminal Q of the flip-flop circuit FF1 is also supplied to the high-side driver 12 to turn off the switch element Q1.

Under heavy load, the feedback quantity FB is small, and therefore, the feedback current IFB is also small. This elongates a charging time in which the voltage of the capacitor C7 reaches the predetermined value.

Under light load, the feedback quantity FB is large, and therefore, the feedback current IFB is also large. This shortens the charging time in which the voltage of the capacitor C7 reaches the predetermined value. Accordingly, the ON time Tho for the switch element Q1 becomes longer under heavy load and shorter under light load.

Operation on the current source I2 side will be explained. When the switch element Q1 is ON, the switch element Q1 passes a current through the primary winding P of the transformer T. The capacitors C4 and C2 divide the current passing through the primary winding P of the transformer T due to the capacitance ratio of the capacitors C4 and C2 and the capacitor C4 outputs the divided current as a detected current to the resistor R4.

Figure 6A:
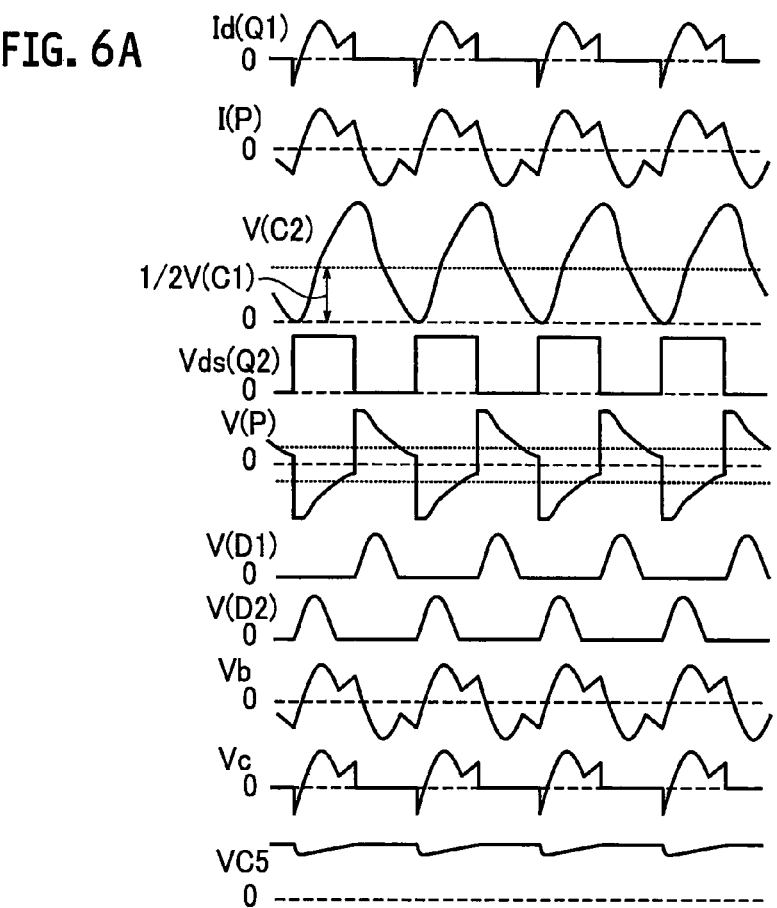
FIGS. 6A and 6B are diagrams illustrating waveforms at different parts of the current resonant power source of Embodiment 1 under heavy and light load.
Figure 6B:
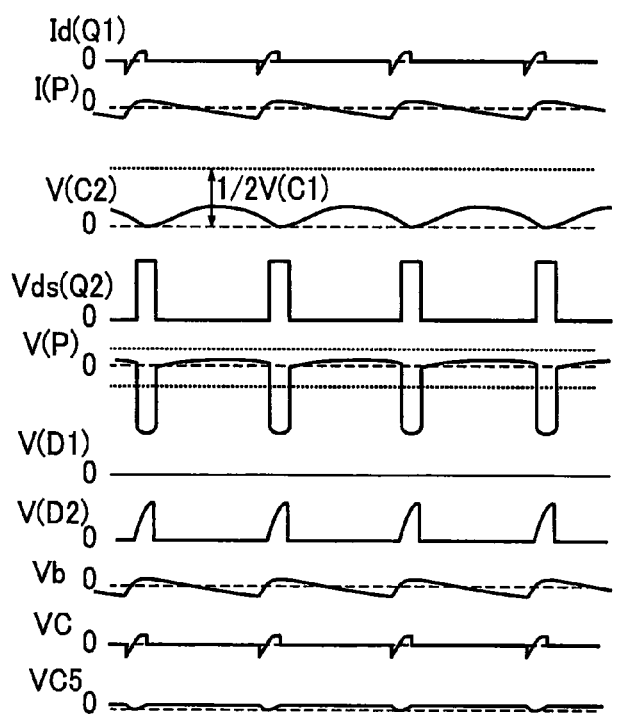

When the switch element Q1 is ON, the output terminal Q of the flip-flop circuit FF1 outputs a high-level signal to turn on the switch SW1. Accordingly, a voltage generated by the resistor R4 is integrated by an integrating circuit including the resistor R3 and capacitor C5 and the capacitor C5 provides an average current value. As illustrated in FIGS. 6A and 6B, the voltage VC5 of the capacitor C5 is small under light load (FIG. 6B) and large under heavy load (FIG. 6A).

The voltage/current converter 14 converts the voltage of the capacitor C5 into a current, which is supplied to the adder 17. The adder 17 adds the current from the voltage/current converter 14 to the current from the current source I2 and charges the capacitor C8 with the resultant current. Accordingly, the voltage of the capacitor C8 increases.

When the voltage of the capacitor C8 exceeds a predetermined value, the buffer BF2 outputs a high-level signal to the set terminal S of the flip-flop circuit FF1. Then, the output terminal Q of the flip-flop circuit FF1 outputs a high-level signal to the high-side driver 12 to turn on the switch element Q1. The high-level signal from the output terminal Q of the flip-flop circuit FF1 is also supplied to the gate of the MOSFET Q4 to turn on the MOSFET Q4. This discharges the capacitor C8.

At this time, the inverting output terminal Qb of the flip-flop circuit FF1 outputs a low-level signal to the gate of the MOSFET Q3 to turn off the MOSFET Q3. This low-level signal is also supplied to the switch element Q2 to turn off the switch element Q2.

Under heavy load, the current from the voltage/current converter 14 is large to shorten a charging time in which the voltage of the capacitor C8 reaches the predetermined value.

Under light load, the current from the voltage/current converter 14 is small to elongate the charging time in which the voltage of the capacitor C8 reaches the predetermined value. As a result, the ON time for the switch element Q2 becomes shorter under heavy load and longer under light load.

Under light load, a voltage V(C2) of the current resonant capacitor C2 varies up and down under a half of a voltage V(C1) as illustrated in FIG. 6B. Namely, when load is light, the ON/OFF times for the switch elements Q1 and Q2 are changed from a duty of 50%, to reduce the charging/discharging current and loss of the current resonant capacitor C2 and improve efficiency.

As mentioned above, the current resonant power source apparatus according to the present embodiment blocks the output of the voltage/current converter 14 at startup, i.e., from time t1 to t4 and passes part of the charging current of the capacitor C6 as the soft-start signals I15 and I16 to the capacitors C7 and C8, to set an ON time for the switch elements Q1 and Q2. During this period, the switch elements Q1 and Q2 are operated with the set ON time, i.e., at a duty of 50%. This increases the voltage VC5 to improve startup performance of the current resonant power source apparatus of Embodiment 1.

As illustrated in FIG. 5, the ON time Tho for the high-side switch element Q1 becomes shorter than a predetermined time (an ON time at a duty of 50%) under light load. In this case, the current resonant capacitor C2 is charged and discharged around a voltage lower than the voltage of the smoothing capacitor C1, so that a sufficient voltage is applied to the primary winding P even with a small charging/discharging current.

Embodiment 2

Figure 7:
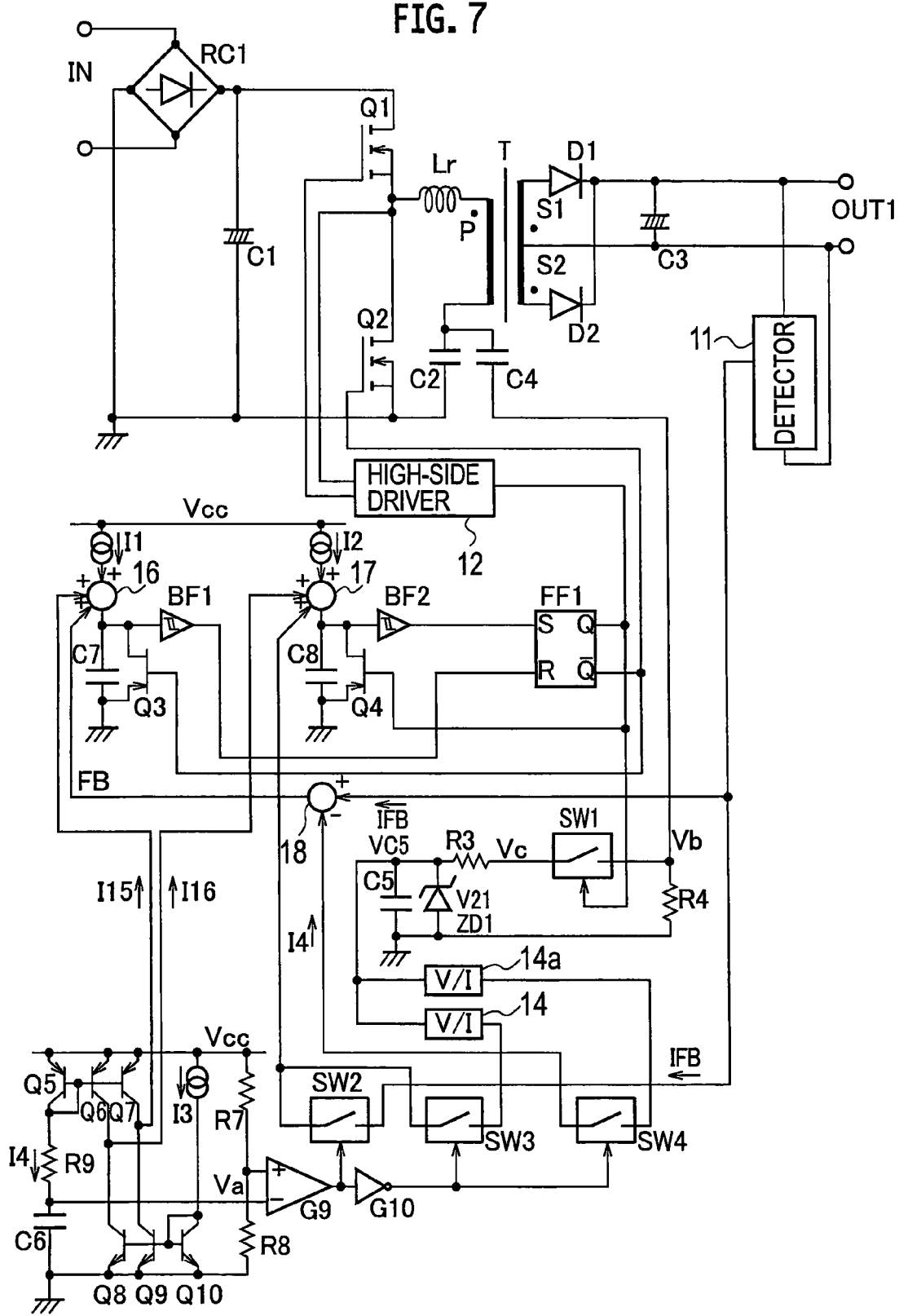
FIG. 7 is a circuit diagram illustrating a current resonant power source apparatus according to Embodiment 2 of the present invention.

FIG. 7 is a circuit diagram illustrating a current resonant power source apparatus according to Embodiment 2 of the present invention. In addition to the configuration of Embodiment 1 illustrated in FIG. 4, the current resonant power source apparatus of Embodiment 2 employs a voltage/current converter 14a, an adder 18, and a switch SW4. Capacitors C4 and C5, resistors R3 and R4, a switch SW1, a zener diode ZD1, the voltage/current converter 14a, and the adder 18 form a third ON time controller.

The voltage/current converter 14a converts a voltage of the capacitor C5 into a current and outputs the current through the switch SW4 to the adder 18. The switch SW4 turns on and off in response to an output from an inverter G10. The adder 18 subtracts the current I4 of the voltage/current converter 14a from a feedback current IFB provided by a detector 11 and outputs the difference to an adder 16. The adder 16 adds the current from the adder 18 to a current from a current source I1 and charges a capacitor C7 with the resultant current.

Figure 8:
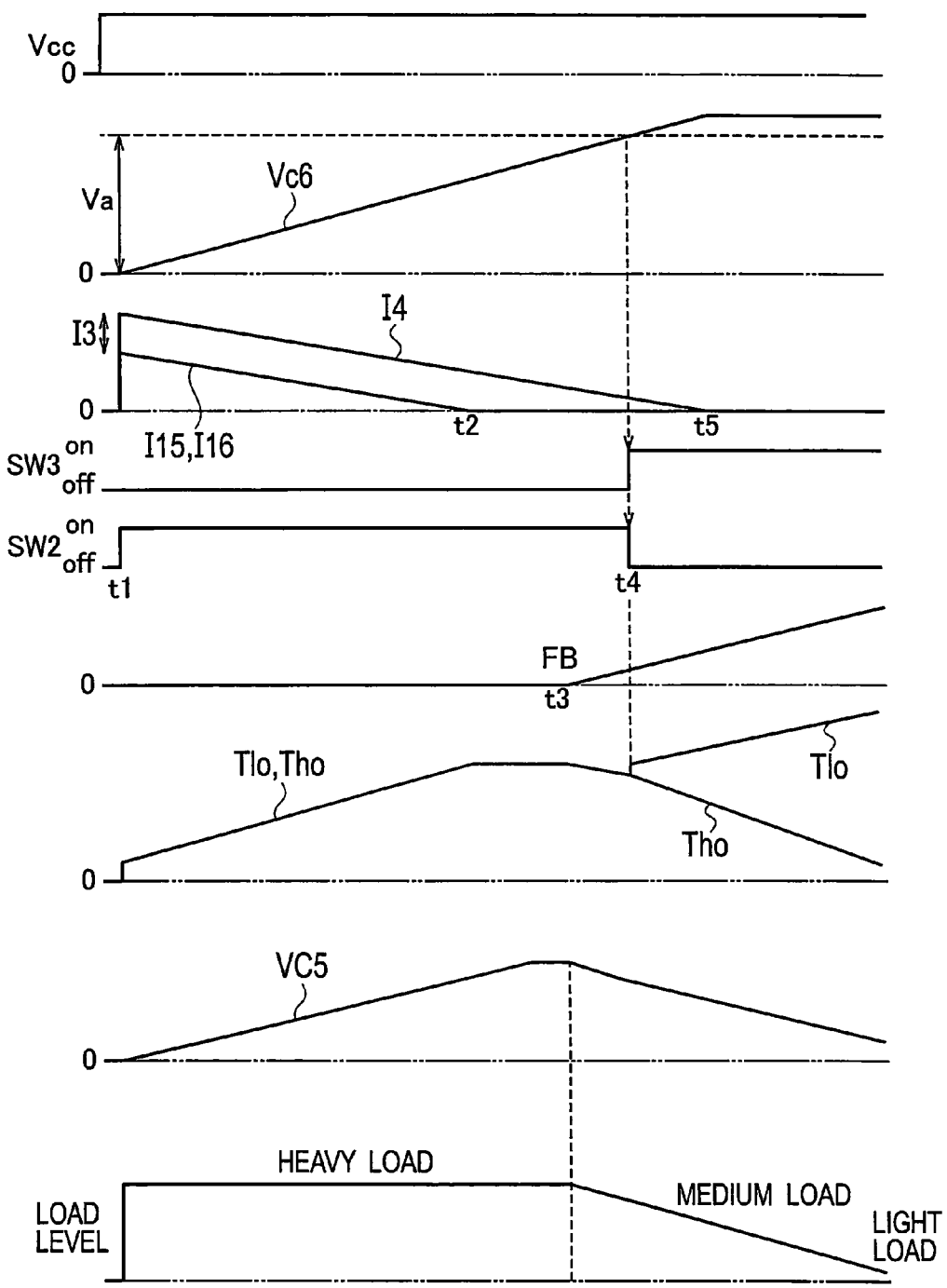
FIG. 8 is a timing chart illustrating a soft-start operation of the current resonant power source apparatus of Embodiment 2 to increase an output voltage at startup.

Operation of the present embodiment will be explained with reference to a timing chart of FIG. 8. A soft-start operation from time t1 to t4 is the same as that of Embodiment 1 illustrated in FIG. 5, and therefore, the explanation thereof will be omitted. From time t1 to t4, the switch SW4 is OFF.

At time t4, a voltage Vc6 of the capacitor C6 reaches a set voltage Va to turn on the switches SW3 and SW4. As a result, an output from a voltage/current converter 14 is applied to an adder 17 and an output from the voltage/current converter 14a is applied to the adder 18.

Under heavy load, the feedback current IFB is zero, and therefore, a current passing through the capacitor C7 is equal to a difference obtained by subtracting the current I4 of the voltage/current converter 14a from the current I1. As load changes from heavy to medium to light, the feedback current IFB gradually increases and the current I4 of the voltage/current converter 14a gradually decreases. As a result, the current fed back to the adder 16 further increases.

Under light load, the capacitor C7 is charged with a larger current, and as illustrated at time t4 and later in FIG. 8, an ON time Tho for a switch element Q1 becomes shorter than that of Embodiment 1. Accordingly, the current resonant power source apparatus of Embodiment 2 realizes a larger effect than that of Embodiment 1.

Like Embodiment 1, Embodiment 2 is capable of improving startup performance.

Embodiment 3

Figure 9:
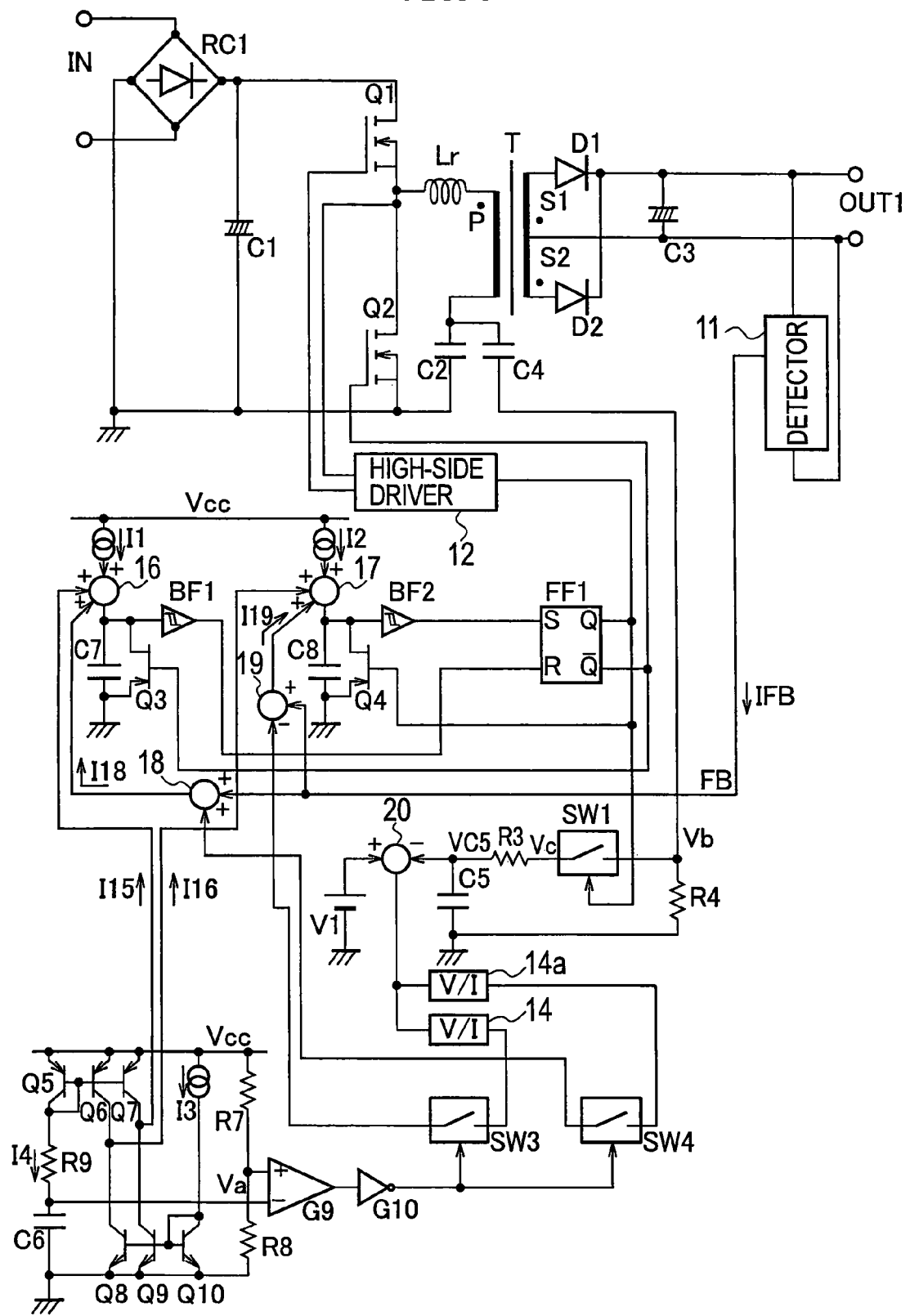
FIG. 9 is a circuit diagram illustrating a current resonant power source apparatus according to Embodiment 3 of the present invention.

FIG. 9 is a circuit diagram illustrating a current resonant power source apparatus according to Embodiment 3 of the present invention. Compared with Embodiment 2 illustrated in FIG. 7, Embodiment 3 eliminates the zener diode ZD1 and additionally employs a reference power source V1 and adders 19 and 20.

The reference power source V1, a voltage VC5 of a capacitor C5, the adder 20, and voltage/current converters 14 and 14a form a load state setting unit that sets a load state to change a duty of a first ON time for a switch element Q1 and a second ON time for a switch element Q2 from 50% to another.

When the load state set by the load state setting unit changes to a lighter load state, the second ON time Tlo for the switch element Q2 is gradually elongated than a predetermined time. Instead of the third ON time controller of Embodiment 2, Embodiment 3 employs a fourth ON time controller that gradually shortens the first ON time Tho for the switch element Q1 than the predetermined time as the load state set by the load state setting unit becomes lighter.

The adder 20 subtracts the voltage VC5 of the capacitor C5 from the voltage of the reference power source V1 and outputs the difference to the voltage/current converters 14 and 14a. If the voltage of the reference power source V1 is greater than the voltage VC5 of the capacitor C5, i.e., if the difference from the adder 20 is positive, the voltage/current converters 14 and 14a change the voltage into currents and output the currents.

The adder 19 subtracts the current from the voltage/current converter 14 from a feedback quantity FB and outputs the difference as a current I19 to an adder 17. The adder 17 adds the current I19 from the adder 19 to a current from a current source I2 and charges a capacitor C8 with the resultant current.

An adder 18 adds the current from the voltage/current converter 14a to the feedback quantity FB and outputs the result as a current I18 to an adder 16. The adder 16 adds the current I18 from the adder 18 to a current from a current source I1 and charges a capacitor C7 with the resultant current.

Figure 10:
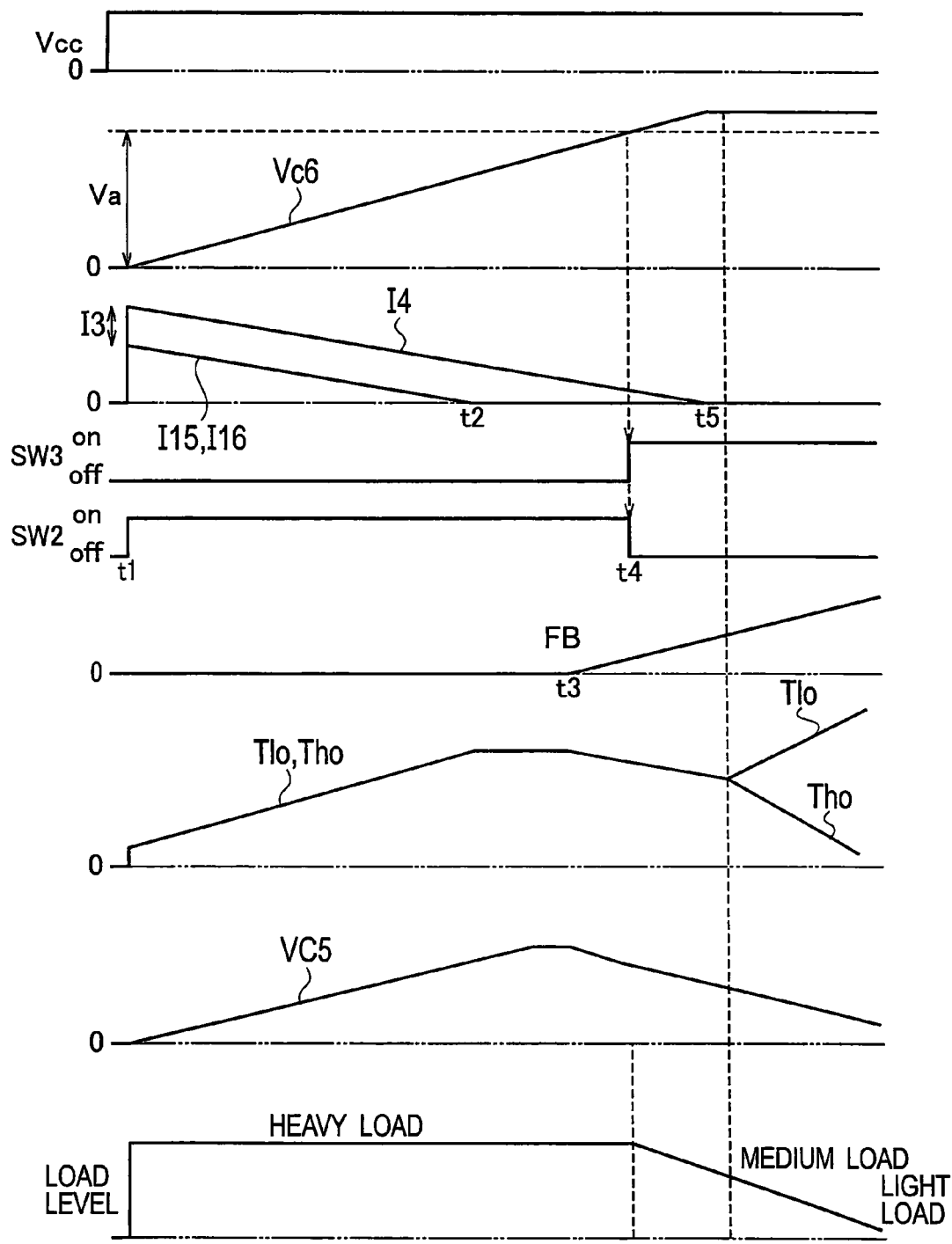
FIG. 10 is a timing chart illustrating a soft-start operation of the current resonant power source apparatus of Embodiment 3 to increase an output voltage at startup.

Operation of the current resonant power source apparatus according to the present embodiment will be explained with reference to FIG. 10. A soft-start operation from time t1 to t4 is the same as that of Embodiment 1 illustrated in FIG. 5, and therefore, the explanation thereof will be omitted. From time t1 to t4, a switch SW4 is OFF.

At time t4, a voltage Vc6 of a capacitor C6 reaches a set voltage Va to turn on switches SW3 and SW4. As a result, an output from the voltage/current converter 14 is sent to the adder 19 and an output from the voltage/current converter 14a to the adder 18.

The voltage of the reference power source V1 is set to a medium value corresponding to a medium load state. If the voltage VC5 of the capacitor C5 is equal to or greater than the voltage of the reference power source V1, the voltage/current converters 14 and 14a are inactive. Namely, from heavy load to medium load, the voltage/current converters 14 and 14a supply no current to the adders 18 and 19. Accordingly, normal control based on only the feedback quantity FB is carried out to determine an ON time for each of the switch elements Q1 and Q2. Namely, the switch elements Q1 and Q2 are driven at a duty of 50%.

At time t5, the voltage VC5 decreases to indicate that the medium load state is changing to a light load state. Then, the adder 20 outputs a positive difference voltage to activate the voltage/current converters 14 and 14a, which output currents to the adders 18 and 19. The adders 18 and 19 add the currents from the voltage/current converters 14 and 14a to the normal feedback quantity FB. As a result, the same operation as Embodiment 2 is carried out from the medium load state to the light load state.

In this way, the current resonant power source apparatus according to Embodiment 3 employs the reference power source V1, the voltage VC5 of the capacitor C5, and the voltage/current converters 14 and 14a to set a load state to change the first ON time Tho for the switch element Q1 and the second ON time Tlo for the switch element Q2 so that the duty of the switch elements Q1 and Q2 changes from 50% to another.

Embodiment 3 chooses an optimum one of the heavy, medium, and light load states as a state to change the duty of the switch elements Q1 and Q2 from 50% to another, thereby improving the efficiency of the current resonant power source apparatus.

Setting a load state at which the duty of the switch elements Q1 and Q2 is changed from another to 50% is similar to setting a load state at which the duty is changed from 50% to another.

Embodiment 3 is able to improve startup performance of the resonant current power source apparatus like Embodiment 1.

Embodiment 4

Figure 11:
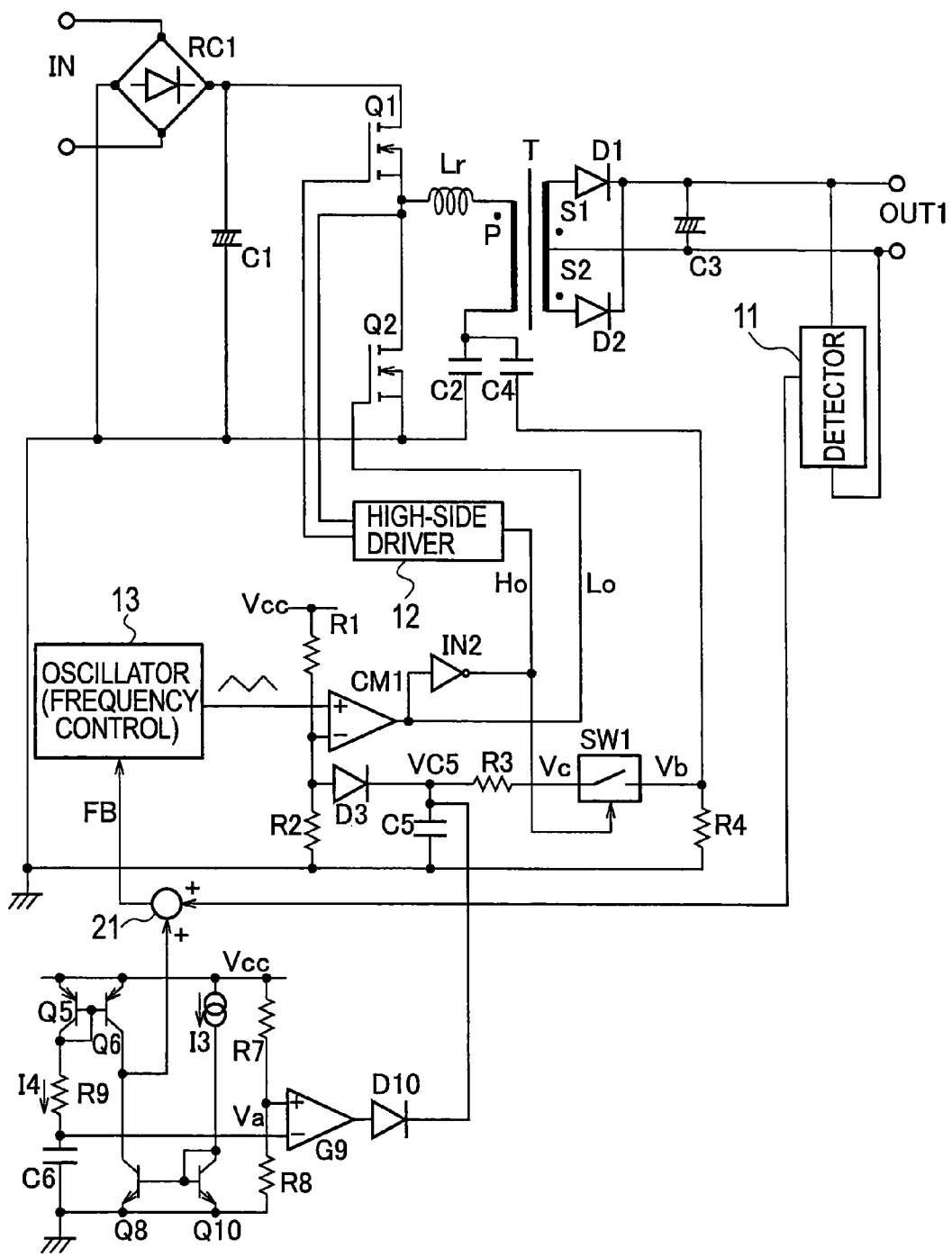
FIG. 11 is a circuit diagram illustrating a current resonant power source apparatus according to Embodiment 4 of the present invention.

FIG. 11 is a circuit diagram illustrating a current resonant power source apparatus according to Embodiment 4 of the present invention. Compared with the soft-start circuit of Embodiment 1 illustrated in FIG. 4, a soft-start circuit of Embodiment 4 eliminates the transistors Q7 and Q9 and adds a diode D10. According to Embodiment 4, a collector of a transistor Q6 is connected to an adder 21. The adder 21 adds a soft-start signal from the transistor Q6 to a feedback quantity FB from a detector 11 and outputs a resultant signal to an oscillator 13. According to the resultant signal from the adder 21, the oscillator 13 determines an oscillation frequency of a frequency signal.

An anode of the diode D10 is connected to an output terminal of a comparator G9 and a cathode of the diode D10 is connected to a first end of a capacitor C5.

Figure 2:
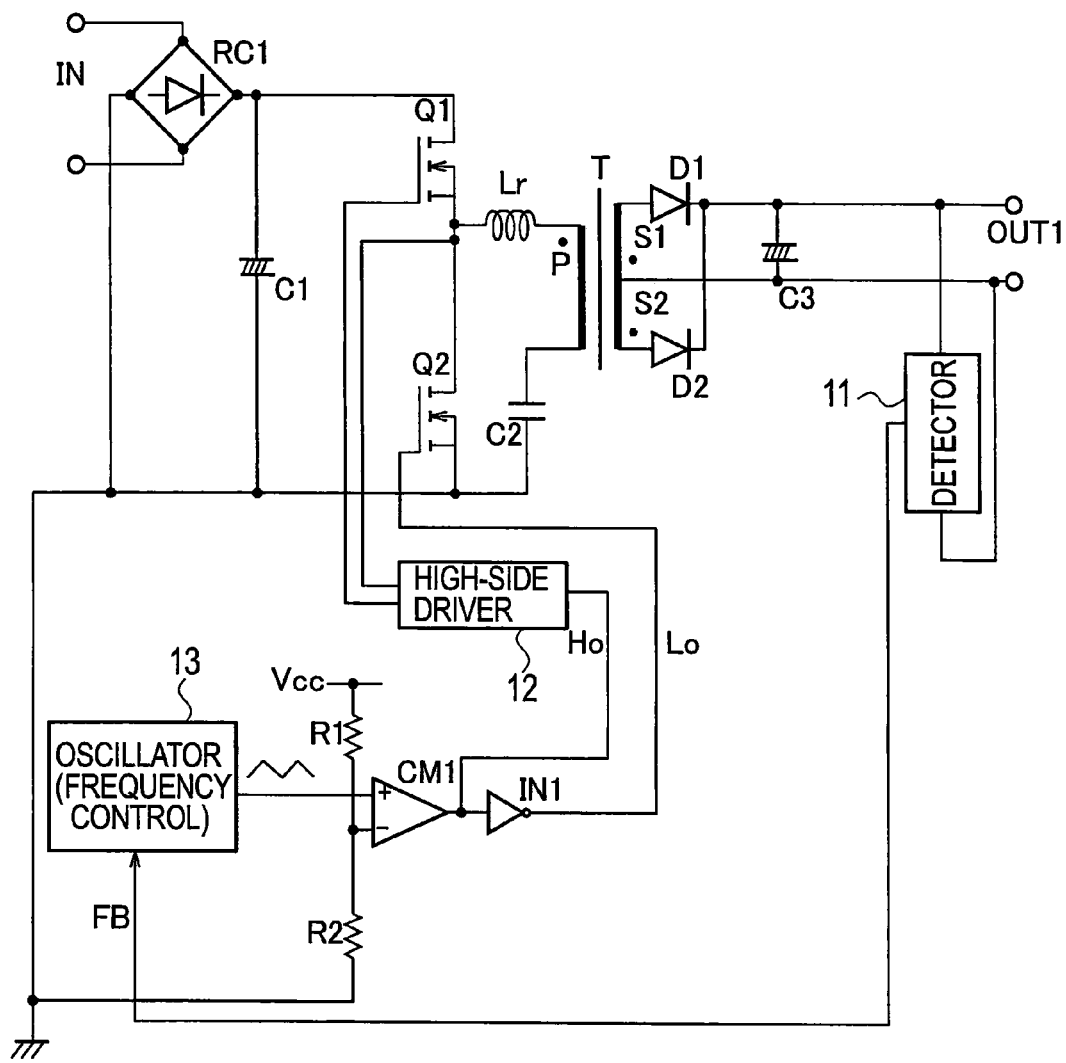
FIG. 2 is a circuit diagram illustrating the current resonant power source apparatus of the related art.
Figure 3:
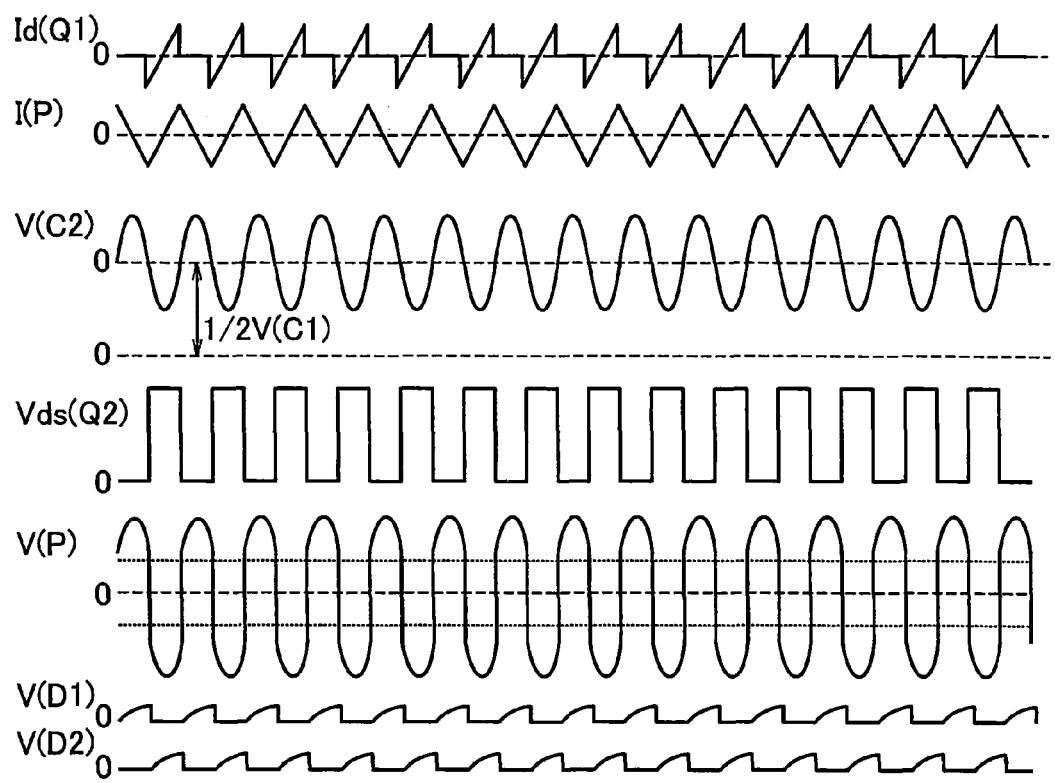
FIG. 3 is a diagram illustrating waveforms at different parts of the current resonant power source apparatus of the related art.

Compared with the related art illustrated in FIG. 2, Embodiment 4 employs a fifth ON time controller that includes capacitors C4 and C5, resistors R3 and R4, a switch SW1, and a diode D3.

When a current divided and detected by the capacitor C4 indicates a light load state, the fifth ON time controller shortens one of the first ON time Tho for a switch element Q1 and second ON time Tlo for a switch element Q2 shorter than a predetermined time and elongates the other longer than the predetermined time.

A connecting scheme of the capacitors C4 and C5, resistors R3 and R4, and switch SW1 is the same as that of Embodiment 1 illustrated in FIG. 4, and therefore, the explanation thereof is omitted.

A first end of the capacitor C5 is connected to a cathode of the diode D3. An anode of the diode D3 is connected to a first end of a resistor R2, a first end of a resistor R1, and an inverting input terminal of a comparator CM1. An output terminal of the comparator CM1 is connected to an input terminal of an inverter IN2 and a gate of the switch element Q2. An output terminal of the inverter IN2 is connected to a high-side driver 12 and to a gate of the switch element Q1.

Figure 12:
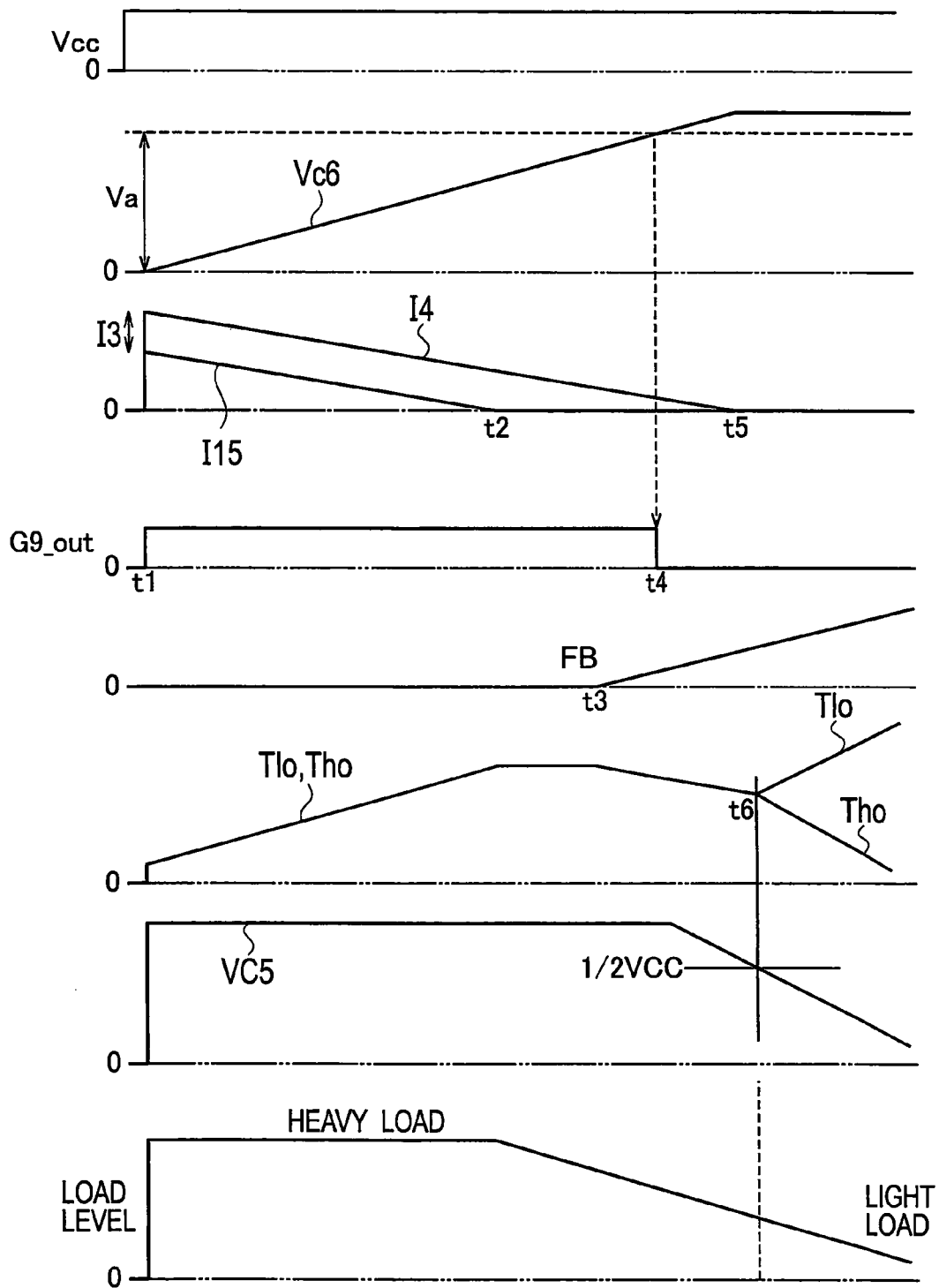
FIG. 12 is a timing chart illustrating a soft-start operation of the current resonant power source apparatus of Embodiment 4 to increase an output voltage at startup.

Operation of the current resonant power source apparatus according to the present embodiment will be explained in detail with reference to FIG. 12.

From time t1 to t4, a voltage Vc6 of a capacitor C6 is smaller than a set voltage Va to turn on the diode D10. A voltage VC5 of the capacitor C5 becomes constant. At the same time, the frequency of the oscillator 13 changes according to the soft-start signal and the ON times Tlo and Tho change at a duty of 50%.

At time t4, the voltage Vc6 of the capacitor C6 reaches the set voltage Va to turn off the diode D10.

When the switch element Q1 is ON, a current passes through the switch element Q1 to a primary winding P of a transformer T. Accordingly, the capacitor C4 divides the current passing through the primary winding P due to a capacitance ratio of the capacitors C2 and C4 and applies the divided current to the resistor R4.

When the switch element Q1 is ON, the inverter IN2 outputs a high-level signal to turn on the switch SW1. Accordingly, a voltage generated by the resistor R4 is integrated in an integration circuit that includes the resistor R3 and capacitor C5. As a result, an average current value is obtained across the capacitor C5. The average current value, i.e., the voltage VC5 is small under light load (time t6) and is large under heavy load.

A reference value at a node between resistors R1 and R2 under light load, therefore, becomes smaller than that under heavy load. If a level of a triangular signal from the oscillator 13 is equal to or greater than the reference voltage, the comparator CM1 outputs a high-level signal to the switch element Q2 to turn on the switch element Q2. If the level of the triangular signal is smaller than the reference voltage, the comparator CM1 outputs a low-level signal to turn off the switch element Q2. Under light load, the reference voltage becomes smaller than that under heavy load, to extend a high-level period of the output of the comparator CM1 to extend the ON time Tlo for the switch element Q2.

The inverter IN2 inverts the output of the comparator CM1. If the triangular signal from the oscillator 13 is smaller than the reference voltage, the inverter IN2 outputs a high-level signal to the switch element Q1 to turn on the switch element Q1. If the triangular signal is equal to or greater than the reference voltage, the inverter IN2 outputs a low-level signal to turn off the switch element Q1. Under light load, the reference voltage becomes smaller than that under heavy load to shorten a high-level period of the inverter IN2 to shorten the ON time Tho for the switch element Q1 as illustrated in FIG. 12.

As mentioned above, the current resonant power source apparatus according to Embodiment 4 provides effects similar to those provided by Embodiment 1.

Embodiment 5

Figure 13:
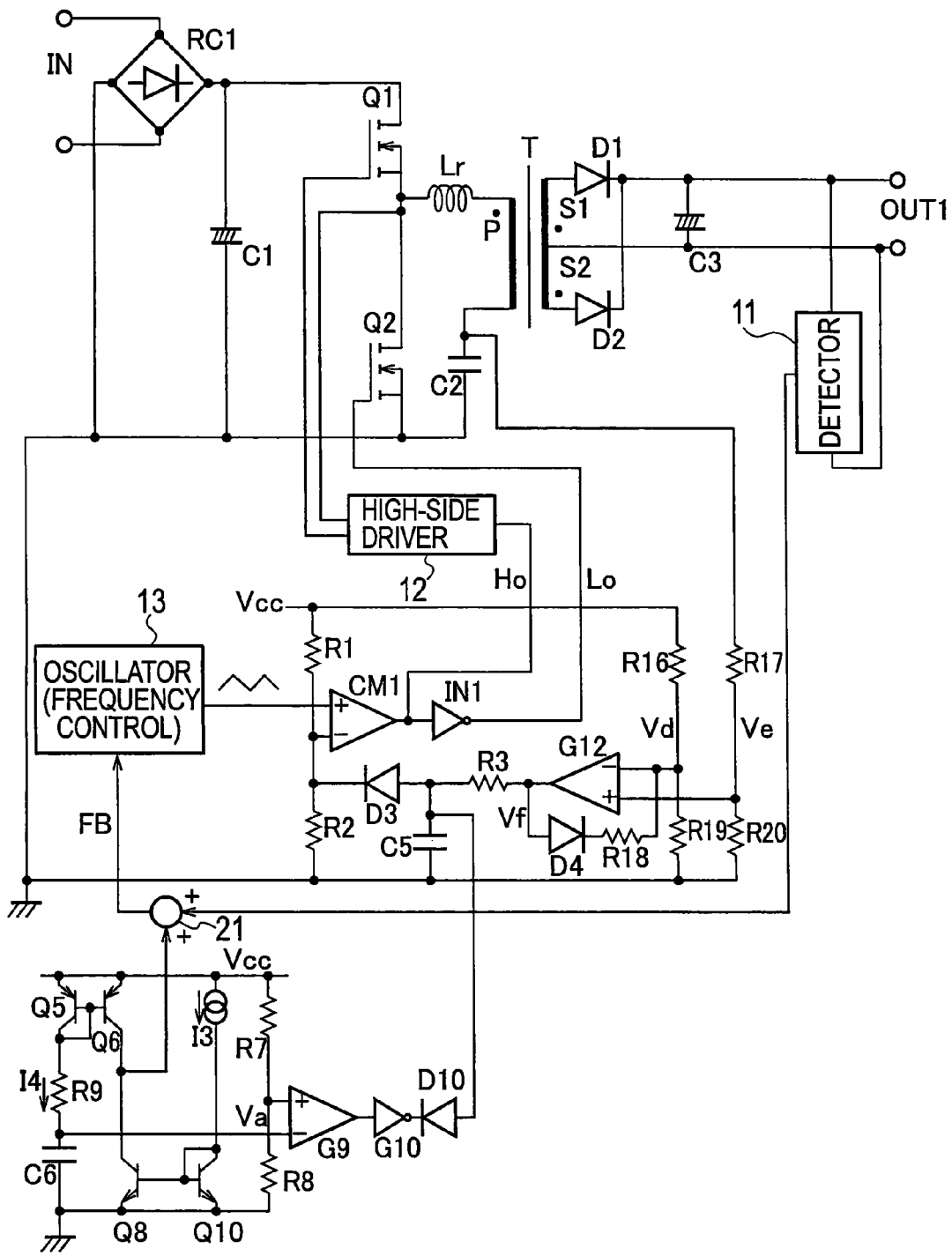
FIG. 13 is a circuit diagram illustrating a current resonant power source apparatus according to Embodiment 5 of the present invention.

FIG. 13 is a circuit diagram illustrating a current resonant power source apparatus according to Embodiment 5 of the present invention. Compared with the soft-start circuit of Embodiment 4 illustrated in FIG. 11, a soft-start circuit of Embodiment 5 adds an inverter G10 between the comparator G9 and the diode D10.

Compared with the related art illustrated in FIG. 2, Embodiment 5 employs a sixth ON time controller that includes a capacitor C5, resistors R3 and R16 to R20, diodes D3 and D4, and an operational amplifier G12.

When a resistor-divided voltage of a capacitor C2 indicates light load, the sixth ON time controller shortens one of the first ON time Tho for a switch element Q1 and second ON time Tlo for a switch element Q2 shorter than a predetermined time and elongates the other longer than the predetermined time.

A first end of the capacitor C2 and a first end of a primary winding P of a transformer T are connected to a first end of the resistor R17. A second end of the resistor R17 is connected to a first end of the resistor R20 and a non-inverting input terminal of the operational amplifier G12. An inverting input terminal of the operational amplifier G12 is connected to a first end of the resistor R16 and a first end of the resistor R19. A second end of the resistor R16 is connected to a power source Vcc. A second end of the resistor R19 is grounded.

Between the inverting input terminal and output terminal of the operational amplifier G12, there is connected a series circuit of the resistor R18 and diode D4. The output terminal of the operational amplifier G12 is connected to a first end of the resistor R3 and an anode of the diode D4. A second end of the resistor R3 is connected to a first end of the capacitor C5 and an anode of the diode D3. A cathode of the diode D3 is connected to a first end of a resistor R1 and a first end of a resistor R2.

Operation of the current resonant power source apparatus according to Embodiment 5 will be explained in detail with reference to FIGS. 14 and 1A to 1C.

From time t1 to t4, a voltage Vc6 of a capacitor C6 is smaller than a set voltage Va, and therefore, the comparator G9 outputs a high-level signal to the inverter G10, which outputs a low-level signal to the cathode of the diode D10 to turn on the diode D10. As a result, a voltage VC5 of the capacitor C5 becomes nearly zero. At the same time, a transistor Q6 outputs a soft-start signal, and in response to which, the frequency of an oscillator 13 changes to change the ON times Tlo and Tho at a duty of 50%.

At time t4, the voltage Vc6 of the capacitor C6 reaches the set voltage Va to turn off the diode D10 and gradually increase the voltage VC5 of the capacitor C5.

When the switch element Q1 is ON, a current passes through the switch element Q1 to the primary winding P of the transformer T, to charge the capacitor C2. Accordingly, a voltage Ve appears on the resistor R20 through the resistor R17. The operational amplifier G12 compares a voltage Vd that is obtained by dividing a voltage of the power source Vcc by the resistors R16 and R19 with the voltage Ve.

Figure 1A:
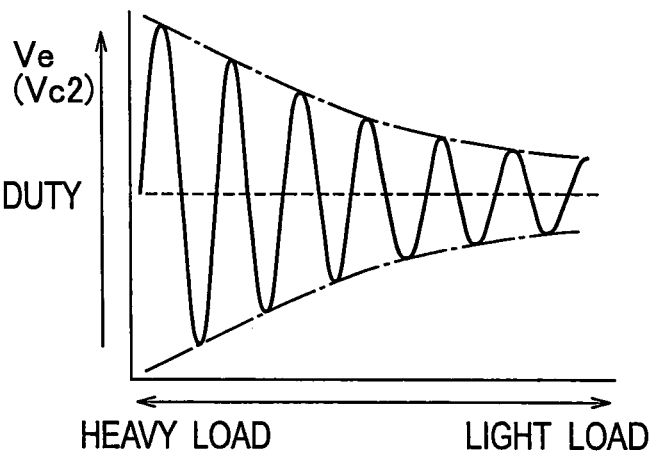
FIGS. 1A to 1C are graphs illustrating voltage waveforms "Ve" of current resonant power source apparatuses according to a related art and Embodiment 5 of the present invention, the related art operating the apparatus at an ON duty of 50% from heavy to light load and Embodiment 5 operating the apparatus according to its own duty control from heavy to light load.
Figure 1B:
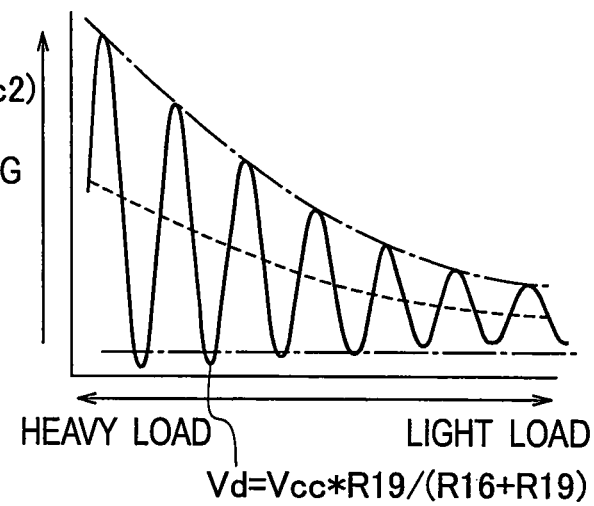

FIG. 1A illustrates a waveform of the voltage Ve when load changes from heavy to light in the current resonant power source apparatus according to the related art at an ON duty of 50%. FIG. 1B illustrates a waveform of the voltage Ve when load changes from heavy to light in the current resonant power source apparatus according to Embodiment 5.

Figure 1C:
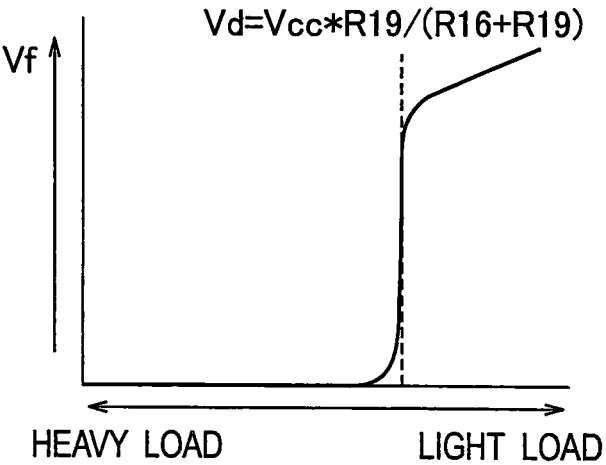

In FIG. 13, the output terminal of the operational amplifier G12 is connected through the diode D4 and resistor R18 to the inverting input terminal of the operational amplifier G12. As illustrated in FIG. 1C, when the voltage Ve at the non-inverting input terminal of the operational amplifier G12 exceeds the initially set voltage Vd, the output of the operational amplifier G12 is applied through the resistor R18 to the inverting input terminal of the operational amplifier G12. Accordingly, a gain of the operational amplifier G12 is determined by a constant of the resistors R18, R16, and R19. This situation corresponds to the light-load side of a Vd line on a Vf characteristic curve illustrated in FIG. 1C. The voltage Vd is equal to "Vcc×R19/(R16+R19)", here, Vcc is a voltage of the power source Vcc.

If the voltage Ve at the non-inverting input terminal of the operational amplifier G12 is smaller than the initially set voltage Vd, the diode D4 is oppositely biased to turn off, and therefore, the operational amplifier G12 demonstrates an open loop gain to output zero volts. At this time, the capacitor C5 is discharged through the resistor R3.

Under heavy load, the discharging of the capacitor C5 exceeds the charging thereof by the operational amplifier G12, and therefore, the Vf characteristic curve on the heavy-load side of the Vd line becomes zero as illustrated in FIG. 1C. Under light load in FIG. 1B, a bottom voltage of the waveform Ve generated by the resistor R20 exceeds the voltage Vd of the resistor R19, to charge the capacitor C5. This increases, through the diode D3, a voltage at the inverting input terminal of the comparator CM1.

Under light load, a bottom voltage of the waveform Ve generated by the resistor R20 is higher than that generated under heavy load, and therefore, the output of the operational amplifier G12 under light load becomes larger than that provided under heavy load. This increases the voltage VC5 of the capacitor C5 to increase a reference voltage at a node between the resistors R1 and R2.

When the triangular signal from the oscillator 13 is equal to or greater than the reference voltage, the comparator CM1 outputs a high-level signal to the switch element Q1. Under light load, the reference voltage becomes higher than that under heavy load, to shorten a high-level period of the output of the comparator CM1 and shorten the ON time Tho for the switch element Q1.

The inverter IN1 inverts the output of the comparator CM1. If the triangular signal from the oscillator 13 is smaller than the reference voltage, the inverter IN1 outputs a high-level signal to the switch element Q2. Under light load, the reference voltage becomes higher than that under heavy load, to elongate the ON time Tlo for the switch element Q2.

In this way, the current resonant power source apparatus according to Embodiment 5 provides effects similar to those provided by Embodiment 1.

The present invention is not limited to the current resonant power source apparatuses of Embodiments 1 to 5. Although the current resonant power source apparatus of Embodiment 5 supplies power to the resistor R16 from the power source Vcc, it is possible, for example, to connect the second end of the resistor R16 to the first end of the smoothing capacitor C1 and the output end of the full-wave rectifying circuit RC1, so that the resistor R16 may receive power from the smoothing capacitor C1. This modification may also provide effects similar to those provided by Embodiment 5. According to the present invention, Embodiments 1 to 5 may be combined in various ways to construct other current resonant power source apparatuses.

In this way, the present invention provides current resonant power source apparatuses that realize improved startup performance.

This application claims benefit of priority under 35USC §119 to Japanese Patent Application No. 2014-043815, filed on Mar. 6, 2014, the entire contents of which are incorporated by reference herein.

What is claimed is:

1. A current resonant power source apparatus comprising:
    first and second switch elements connected in series with both ends of a DC power source;
    a series circuit connected between a node of the first and second switch elements and a first end of the DC power source and including a reactor, a primary winding of a transformer, and a capacitor;
    a full-wave rectifying and smoothing circuit that full-wave-rectifies and smoothes a voltage generated at a secondary winding of the transformer and provides a DC voltage;
    a control circuit that alternately turns on/off the first and second switch elements according to a first ON time for the first switch element and a second ON time for the second switch element;
    a voltage detector detecting the DC voltage provided by the full-wave rectifying and smoothing circuit;
    a current detector detecting a current passing through the primary winding of the transformer;
    a soft-start time constant setting unit generating a soft-start signal at startup and sets a soft-start time constant; and
    an ON time controller, wherein:
    if a voltage generated according to the time constant set by the soft-start time constant setting unit is smaller than a set voltage, the ON time controller sets an ON time duty for the first and second switch elements at 50% according to the DC voltage from the voltage detector and the soft-start signal; and
    if the voltage generated according to the time constant is equal to or greater than the set voltage, the ON time controller sets one of the first and second ON times according to the current detected by the current detector.

2. The current resonant power source apparatus of claim 1, wherein
    if load is light, the ON time controller shortens one of the first ON time for the first switch element and the second ON time for the second switch element shorter than a predetermined time according to the DC voltage detected by the voltage detector.

3. The current resonant power source apparatus of claim 2, further comprising a second ON time controller, wherein
    if load is light, the second ON time controller shortens one of the first ON time for the first switch element and the second ON time for the second switch element shorter than the predetermined time according to the current detected by the current detector.

4. The current resonant power source apparatus of claim 3, further comprising
    a load state setting unit that sets a load state to switch a duty of the first ON time for the first switch element and the second ON time for the second switch element from 50% to another duty, wherein
    as the load state set by the load state setting unit changes to a lighter load state, the third ON time controller gradually shortens one of the first ON time for the first switch element and the second ON time for the second switch element shorter than the predetermined time.

5. The current resonant power source apparatus of claim 1, wherein the ON time controller comprises a first ON time controller and a second ON time controller, wherein
    if load is light, the first ON time controller shortens one of the first ON time for the first switch element and the second ON time for the second switch element shorter than a predetermined time according to the DC voltage detected by the voltage detector; and
    the second ON time controller elongates one of the first ON time for the first switch element and the second ON time for the second switch element longer than the predetermined time according to the current detected by the current detector.

6. The current resonant power source apparatus of claim 5, further comprising a third ON time controller, wherein
    if load is light, the third ON time controller shortens one of the first ON time for the first switch element and the second ON time for the second switch element shorter than the predetermined time according to the current detected by the current detector.

7. The current resonant power source apparatus of claim 6, further comprising
a load state setting unit that sets a load state to switch a duty of the first ON time for the first switch element and the second ON time for the second switch element from 50% to another duty, wherein
as the load state set by the load state setting unit changes to a lighter load state, the third ON time controller gradually shortens one of the first ON time for the first switch element and the second ON time for the second switch element shorter than the predetermined time.

8. The current resonant power source apparatus of claim 5, further comprising:
a load state setting unit that sets a load state to switch a duty of the first ON time for the first switch element and the second ON time for the second switch element from 50% to another duty; and
a fourth ON time controller that, as the load state set by the load state setting unit changes to a lighter load state, gradually elongates the other of the first ON time for the first switch element and the second ON time for the second switch element longer than the predetermined time.

9. The current resonant power source apparatus of claim 1, wherein the reactor is a leakage inductance of the transformer.

10. A current resonant power source apparatus comprising:
first and second switch elements connected in series with both ends of a DC power source;
a series circuit connected between a node of the first and second switch elements and a first end of the DC power source and including a reactor, a primary winding of a transformer, and a capacitor;
a full-wave rectifying and smoothing circuit that full-wave-rectifies and smoothes a voltage generated by a secondary winding of the transformer and provides a DC voltage;
a control circuit that alternately turns on/off the first and second switch elements according to a first ON time duty for the first switch element and a second ON time duty for the second switch element of 50% and controls a switching frequency of the first and second switch elements according to the DC voltage;
a current detecting unit detecting a current of the capacitor;
a soft-start time constant setting unit generating a soft-start signal at startup and sets a soft-start time constant; and
an ON time controller, wherein:
if a voltage generated according to the time constant set by the soft-start time constant setting unit is smaller than a set voltage, the ON time controller sets an ON time for the first and second switch elements according to the DC voltage and soft-start signal; and
if the voltage generated according to the time constant is equal to or greater than the set voltage, the ON time controller sets an ON time for the first and second switch elements according to the current of the capacitor detected by the current detecting unit.

11. The current resonant power source apparatus of claim 10, further comprising a second ON time controller, wherein if load is light, the second ON time controller shortens one of the first ON time for the first switch element and the second ON time for the second switch element shorter than the predetermined time and elongates the other of the first ON time for the first switch element and the second ON time for the second switch element longer than the predetermined time according to the current detected by the current detector.

12. A current resonant power source apparatus comprising:
first and second switch elements connected in series with both ends of a DC power source;
a series circuit connected between a node of the first and second switch elements and a first end of the DC power source and including a reactor, a primary winding of a transformer, and a capacitor;
a full-wave rectifying and smoothing circuit that full-wave-rectifies and smoothes a voltage generated by a secondary winding of the transformer and provides a DC voltage;
a control circuit that alternately turns on/off the first and second switch elements according to a first ON time for the first switch element and a second ON time for the second switch element and controls a switching frequency of the first and second switch elements according to the DC voltage;
a voltage detecting unit detecting a voltage of the capacitor;
a soft-start time constant setting unit generating a soft-start signal at startup and sets a soft-start time constant; and
an ON time controller, wherein:
if a voltage generated according to the time constant set by the soft-start time constant setting unit is smaller than a set voltage, the ON time controller sets an ON time duty for the first and second switch elements at 50% according to the DC voltage and soft-start signal; and
if the voltage generated according to the time constant is equal to or greater than the set voltage, the ON time controller sets an ON time for the first and second switch elements according to the voltage of the capacitor detected by the voltage detecting unit.

* * * * *